US007225064B2

(12) United States Patent
Fudali et al.

(10) Patent No.: US 7,225,064 B2
(45) Date of Patent: May 29, 2007

(54) WIRELESS COMMUNICATION FOR DIAGNOSTIC INSTRUMENT

(75) Inventors: Thomas M. Fudali, McHenry, IL (US); William D. Nicholson, Waukesha, WI (US)

(73) Assignees: Snap-On Technologies, Inc., Lincolnshire, IL (US); Autologic, L.L.C., Sussex, WI (US)

( * ) Notice: Subject to any disclaimer, the term of this patent is extended or adjusted under 35 U.S.C. 154(b) by 528 days.

(21) Appl. No.: 10/697,160

(22) Filed: Oct. 31, 2003

(65) Prior Publication Data

US 2005/0096805 A1 May 5, 2005

(51) Int. Cl.
*G01M 17/00* (2006.01)

(52) U.S. Cl. .......................................... 701/29; 701/33

(58) Field of Classification Search .................. 701/29, 701/30, 33, 34, 35; 340/989, 3.1, 3.3, 3.32, 340/825.36
See application file for complete search history.

(56) References Cited

U.S. PATENT DOCUMENTS 6,181,994 B1 1/2001 Colson et al.
6,754,562 B2 6/2004 Strege et al.
6,847,872 B2 * 1/2005 Bodin et al. .................. 701/33
7,089,096 B2 * 8/2006 Liebl et al. .................... 701/29
7,092,803 B2 * 8/2006 Kapolka et al. .............. 701/29
7,103,460 B1 * 9/2006 Breed .......................... 701/29
2002/0193910 A1 12/2002 Strege et al.

FOREIGN PATENT DOCUMENTS

WO WO 03/027629 A1 4/2003
WO WO 03/058188 A2 7/2003
WO WO 03/077205 A2 9/2003

* cited by examiner

*Primary Examiner*—Richard M. Camby
(74) *Attorney, Agent, or Firm*—McDermott Will & Emery LLP

(57) ABSTRACT

A wireless interface for a diagnostic instrument is provided. The diagnostic instrument includes a communications interface having an external data port. A wireless adapter coupled to the external data port communicates diagnostic data with one or more computing devices. In a single user mode, a computing device can control several diagnostic instruments wirelessly. In broadcast mode, a diagnostic instrument can send a data stream wirelessly to many listening computing devices. Further features, such as safety warning messages, are provided.

3 Claims, 11 Drawing Sheets

WIRELESS COMMUNICATION FOR DIAGNOSTIC INSTRUMENT

TECHNICAL FIELD

The present disclosure relates generally to diagnostic instruments, and more particularly, to diagnostic instruments using wireless communication interfaces.

BACKGROUND

Conventional computing devices, such as PCs and handheld computers, provide a convenient platform for communicating with diagnostic instrumentation. The computing devices enable a technician to use a diagnostic instrument quickly and easily. For example, in an automotive service facility, a handheld computing device can be easily connected to a vehicle's on-board diagnostic system for testing or problem diagnosis.

Although handheld computing devices offer portability and flexibility, the diagnostic instruments with which they are designed to work typically require serial communication cables or other wireline infrastructure to communicate. Consequently much of a handheld computing device's portability is compromised when it must be coupled to a wireline interface.

In addition, a technician may use several diagnostic instruments when diagnosing a problem or evaluating a vehicle's performance. Typically each of these diagnostic instruments requires various wireline connections to the computing device. Many such connections can become cumbersome for the technician to manage. An improper or incorrect connection may cause the computing device to malfunction or to provide inaccurate information and, therefore, consume diagnostic or repair time needlessly.

Conventional wireline interfaces also complicate the use of diagnostic instruments for technician training or other collaborative work. In particular, traditional diagnostic instruments are designed for one-to-one operation with a single host or computing device. Using a single computing device can make it difficult for a group of users to view the results or to collaborate in the process.

Further, service facilities have invested in many diagnostic instruments that have wireline interfaces. Adding wireless capability to a diagnostic instrument has conventionally involved redesigning the internal circuitry to support the wireless functionality. Thus service facilities may be reluctant to reinvest in the costly replacement or redesign of their diagnostic instruments in order to have wireless capability.

What is needed is a wireless adapter for a diagnostic instrument. What is further needed is a wireless architecture that enables concurrent communication among a number of diagnostic instruments and computing devices.

SUMMARY OF THE DISCLOSURE

In one aspect, a method for wireless communication of vehicle diagnostic information includes obtaining a diagnostic instrument having an external data port. A wireless adapter coupled to the external data port communicates diagnostic data with one or more computing devices.

In another aspect, a computing device can be configured to control several diagnostic instruments wirelessly. The computing device can send control command to one or more diagnostic instrument sequentially or concurrently. The computing device can also perform time base synchronization to provide a technician with integrated diagnostic information obtained from more than one diagnostic instrument.

In another aspect, a diagnostic instrument can send a data stream wirelessly to many listening computing devices. The diagnostic instrument can also broadcast multiple data streams that are individually tailored for particular computing devices.

In yet another aspect, a diagnostic instrument can function as a wireless network gateway or hub device. A first computing device can send data, such as diagnostic information, to a second computing device. This can facilitate collaborative work among users of the computing devices.

Additional aspects and advantages of the present disclosure will become readily apparent to those skilled in this art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The accompanying drawings illustrate several embodiments and, together with the description, serve to explain the principles of the present disclosure.

DETAILED DESCRIPTION OF THE EMBODIMENTS

The present disclosure is now described more fully with reference to the accompanying figures, in which several embodiments are shown. The embodiments described herein may include or be utilized with any appropriate engine having an appropriate voltage source, such as a battery, an alternator and the like, providing any appropriate voltage, such as about 12 Volts, about 42 Volts and the like. The embodiments described herein may be used with any desired system or engine. Those systems or engines may comprise items utilizing fossil fuels, such as gasoline, natural gas, propane and the like, electricity, such as that generated by battery, magneto, solar cell and the like, wind and hybrids or combinations thereof. Those systems or engines may be incorporated into other systems, such as an automobile, a truck, a boat or ship, a motorcycle, a generator, an airplane and the like.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. System Architecture

Figure 1:
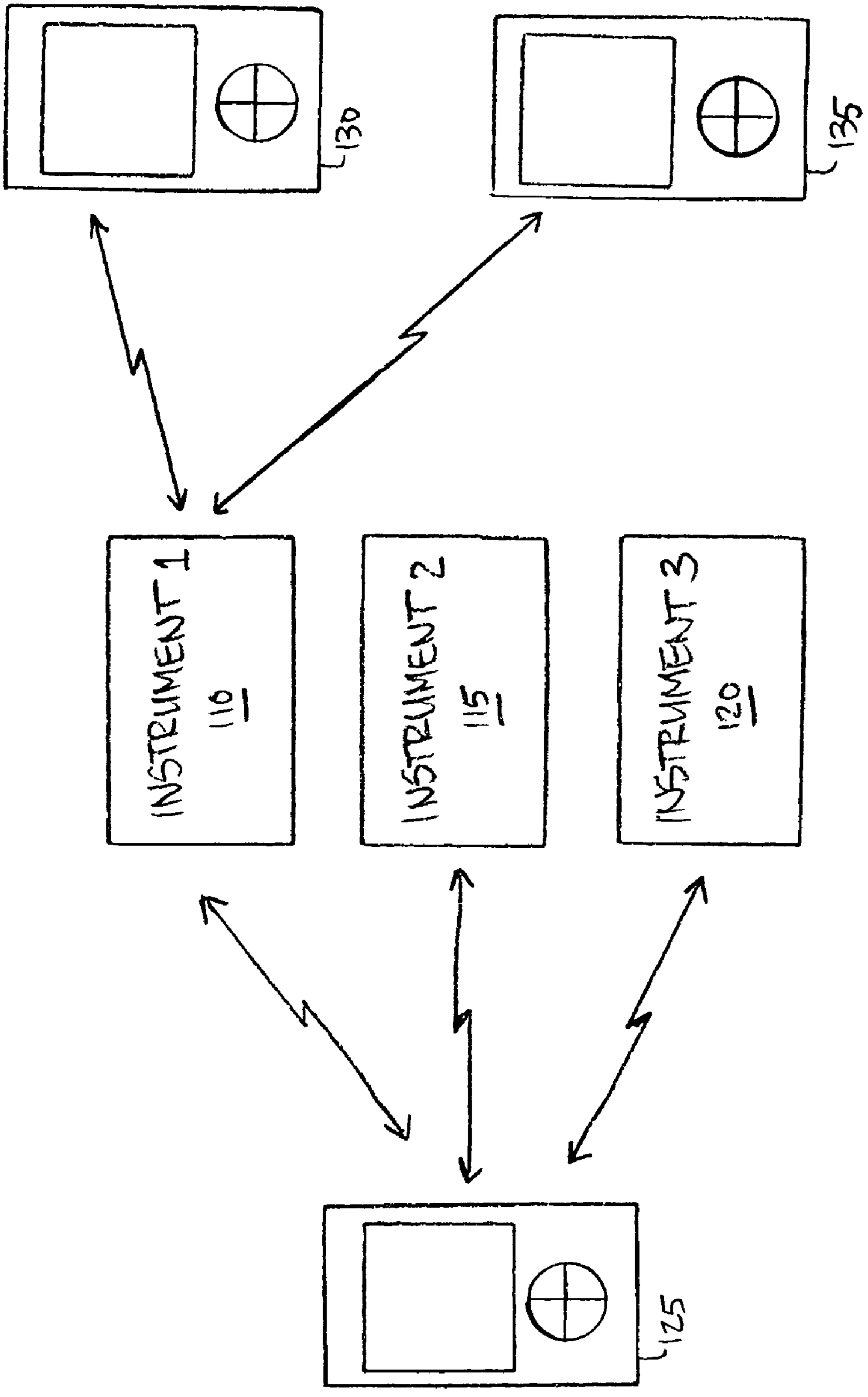
FIG. 1 is a diagram illustrating a wireless architecture according to an embodiment of the present disclosure.

FIG. 1 is a diagram illustrating a wireless architecture according to an embodiment of the present disclosure. The illustrated embodiment includes a first diagnostic instrument 110, a second diagnostic instrument 115, and a third diagnostic instrument 120. Wirelessly coupled to the diagnostic instruments 110, 115, 120 are a first computing device 125, a second computing device 130, and a third computing device 135.

The computing devices 125, 130, 135 and the diagnostic instruments 110, 115, 120 exchange data or communicate to form a wireless network. Various protocols or signaling techniques can be used on the wireless communication paths. Example wireless protocols include local area protocols such as Ethernet (e.g., 802.11a, 802.11b, 802.11 g), Bluetooth, and infrared. Other wireless protocols include cellular-based protocols, such as CDMA, GSM, or GPRS, or satellite-based protocols.

Although in the illustrated embodiment each communication path is wireless, one skilled in the art will appreciate that hybrid wireline and wireless networks can be implemented. That is, some computing devices can be coupled to associated diagnostic instruments via wireline connections. As described in further detail below and with reference to FIG. 3, the diagnostic instruments 110, 115, 120 can include both wireline and wireless interfaces that operate separately or concurrently.

In one embodiment, the computing devices 125, 130, 135 are conventional handheld computers, such as a Compaq Ipaq (which is commercially available from Hewlett-Packard, Palo Alto, Calif.) or a Palm Zire (which is commercially available from Palm, Inc., Milpitas, Calif.). Although one skilled in the art will recognize that the computing devices 125, 130, 135 need not be functionally or structurally identical, for clarity of the following description, the computing devices 125, 130, 135 may be described in terms of the first computing device 125. Further features and functionalities of exemplary computing device 125 are described below and with reference to FIG. 4.

In an embodiment, the diagnostic instruments 110, 115, 120 are instruments such as those used in the maintenance, service, or repair of automobiles, trucks, engines, vessels, motorcycles, generators, aircraft and the like. Examples of diagnostic instruments 110, 115, 120 include code scanners, gas analyzers, and smoke meters. One skilled in the art will appreciate, however, that the diagnostic instruments 110, 115, 120 need not be distinct from the equipment and can represent, for example, onboard or integrated diagnostic, performance, or testing functionality. For example, the first diagnostic instrument 110 can represent a vehicle's onboard OBD-II interface and can convert the ODB-II diagnostic information to an appropriate wireless communication protocol for communication with the second computing device 130.

1. Single User Mode

The diagnostic instruments 110, 115, 120 send diagnostic information to and receive control commands from the computing devices 125, 130, 135 wirelessly. Single user mode refers to one computing device, such as the first computing device 125, communicating with one or more of the diagnostic instruments 110, 115, 120. In the illustrated embodiment, the first computing device 125 sends data to each of the first, second, and third diagnostic instruments 110, 115, 120. Similarly, each of the first, second, and third diagnostic instruments 110, 115, 120 send diagnostic information to the first computing device 125.

Unlike conventional wireline communication between a first computing device 125 and a first diagnostic instrument 110, wireless communications paths are not limited to one-to-one data exchanges. Specifically, a wireless architecture enables a one-to-many relationship among the diagnostic instruments 110, 115, 120 and the computing devices 125, 130, 135.

In the illustrated embodiment, the first computing device 125 is concurrently coupled to and communicating with each of the first, second, and third diagnostic instruments 110, 115, 120. This enables the first computing device 125, for example, to coordinate diagnostic tests or other functions among an RPM meter, gas analyzer, and smoke meter.

One advantage of this configuration is that the first computing device 125 can receive diagnostic information from a variety of sources and integrate this information to perform comprehensive testing. In troubleshooting a problem, for example, a technician may need information about an engine's emissions when running at 2000 RPM. The first computing device 125 can synchronize the measurement time base for several diagnostic instruments 110, 115, 120 to provide the technician with an integrated solution. Synchronization and other features are described in additional detail below.

2. Broadcast Mode

In broadcast mode, one or more diagnostic instruments 110, 115, 120 communicate with two or more computing devices 125, 130, 135. In the illustrated embodiment, the first diagnostic instrument 110 concurrently communicates with the second and the third computing devices 130, 135. For example, a gas analyzer can transmit a data stream that is received by both the second and the third computing devices 130, 135. In this case, the data stream includes diagnostic information about a vehicle's emissions.

In addition, the first diagnostic instrument 110 can provide multiple data streams. Each of these data streams can be directed to particular computing devices 125, 130, 135. More specifically, the first diagnostic instrument 110 can provide unicast or multicast data streams of diagnostic information.

One advantage of unicast data streams directed to different computing devices 125, 130, 135 is that each data stream need not include identical diagnostic information. For example, in a technician training environment, the instructor may receive all of the data from the gas analyzer, but the computing devices 125, 130, 135 belonging to the students may receive a subset of the data to enhance their training.

Additionally, the wireless signals communicated by the diagnostic instruments 110, 115, 120 and the computing devices 125, 130, 135 can be encrypted to ensure data privacy. One skilled in the art will appreciate that many suitable encryption technologies can be implemented in the present wireless architecture. For example, in an 802.11 environment, WiFi Protected Access (WPA) can be used. Further, authorization codes or encryption can be used to prevent unauthorized use of the diagnostic instruments 110, 115, 120 or the computing devices 125, 130, 135.

Figure 2:
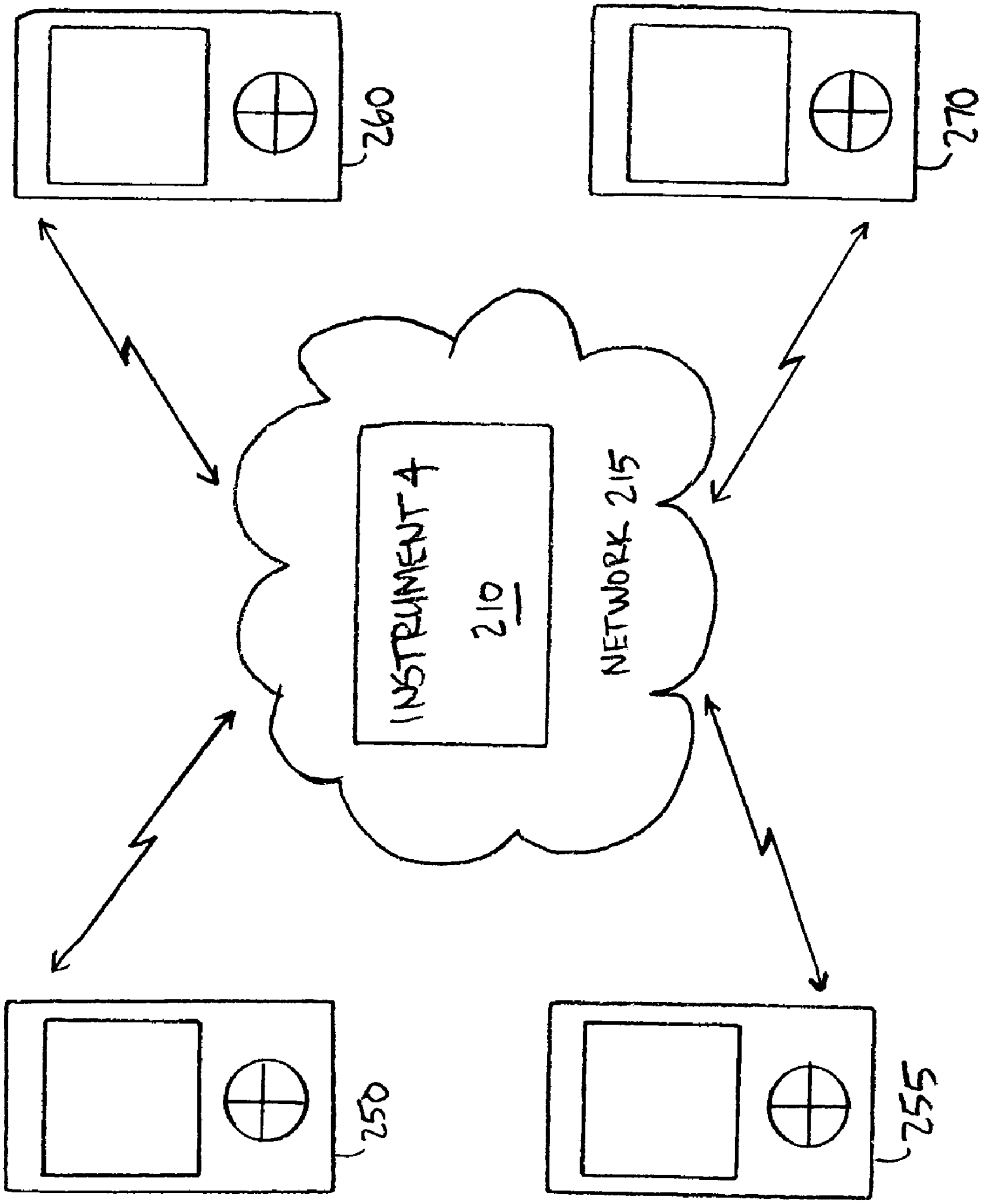
FIG. 2 is a diagram illustrating a wireless architecture according to another embodiment of the present disclosure.

FIG. 2 is a diagram illustrating a wireless architecture according to another embodiment of the present disclosure. The illustrated embodiment includes a fourth diagnostic instrument 210 and several computing devices 250, 255, 260, 270. The fourth diagnostic instrument 210 is wirelessly coupled to each of the several computing devices 250, 255, 260, 270.

In addition to its diagnostic functionality, the fourth diagnostic instrument 210 includes wireless gateway or network hub functionality for a network 215. In one embodiment, the fourth diagnostic instrument 210 can function as a relay device. More specifically, the fourth diagnostic instrument 210 can receive data from computing device 250 and forward that data to computing device 255. The fourth diagnostic instrument 210 may include tables or other data structures that contain information about how forward data packets and which computing devices 250, 255, 260, 270 are currently available on the network 215.

One advantage of the illustrated wireless architecture is that it can enable enhanced collaborative work among users. For example, a technician using computing device 250 can highlight real-time diagnostic information on computing device 255 that is being used by another technician. Further, a technician can send a waveform or other diagnostic information from computing device 250 to computing device 270 for analysis by another technician.

B. Diagnostic Instrument

Figure 3:
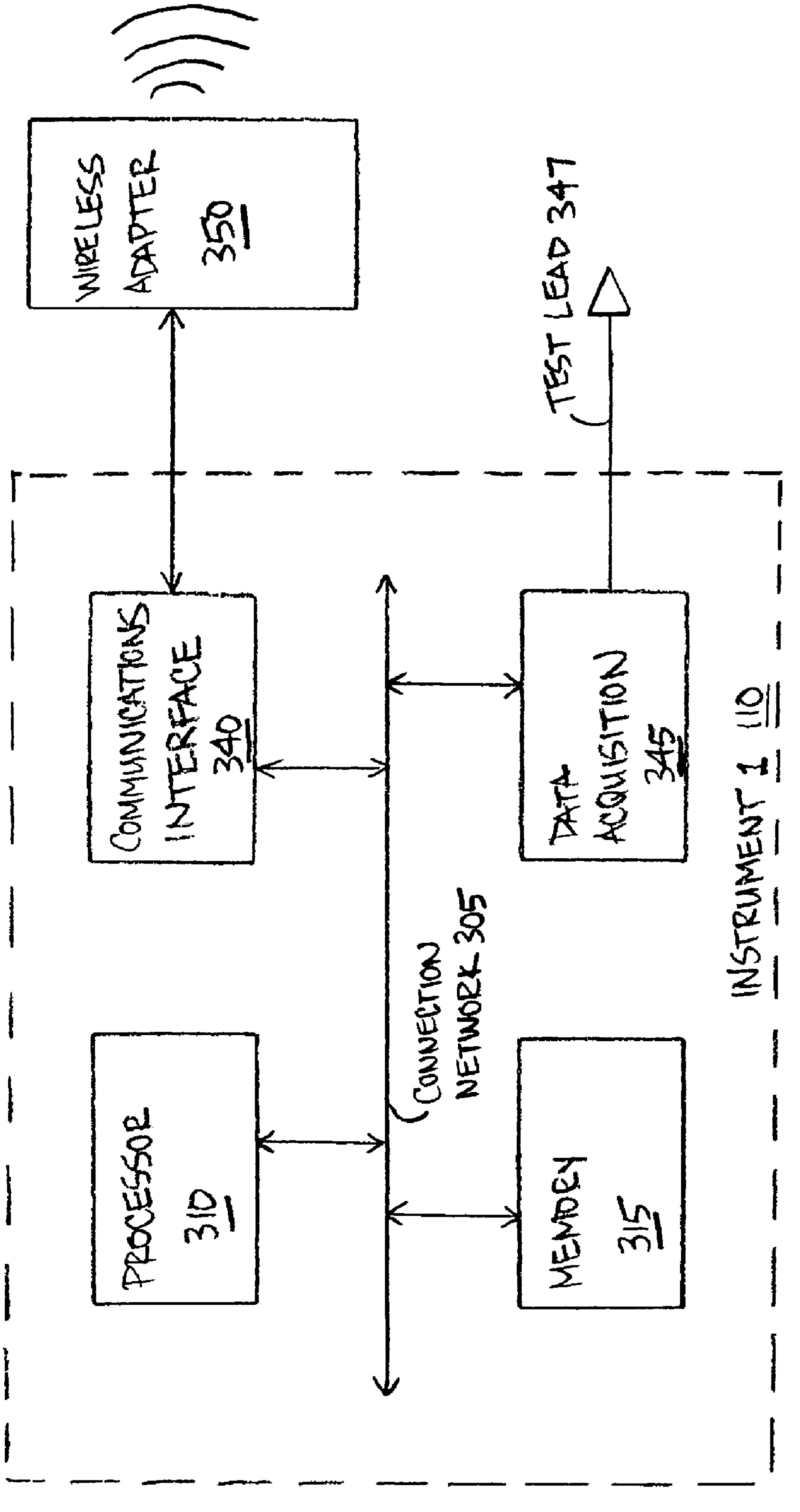
FIG. 3 is a block diagram of a diagnostic instrument according to an embodiment of the present disclosure.

FIG. 3 is a block diagram of a diagnostic instrument according to an embodiment of the present disclosure. Although each of the diagnostic instruments 110, 115, 120, 210 can have different features, the first diagnostic instrument 110 is described in additional detail as an example embodiment. In the illustrated embodiment, the first diagnostic instrument 110 includes a connection network 305, a processor 310, a memory 315, a communications interface 340, and a data acquisition unit 345. A wireless adapter 350 is shown coupled to the communications interface 340.

The connection network 305 operatively couples each of the processor 310, the memory 315, the communications interface 340, and the data acquisition unit 345. The connection network 305 can be an electrical bus, switch fabric, or other suitable interconnection system.

The processor 310 is a conventional microprocessor or microcontroller. In one embodiment, the first diagnostic instrument 110 is portable and powered by a battery. In this instance, the processor 310 or other circuitry may be designed for low power operation in order to provide satisfactory runtime before requiring recharging or replacement of the battery. In a typical service facility, satisfactory runtime is approximately 8 hours or the duration of a technician's shift.

The processor 310 executes instructions or program code modules from the memory 315. The operation of the first diagnostic instrument 110 is programmable and configured by the program code modules. Such instructions may be read into memory 315 from another computer readable medium. Execution of the sequences of instructions contained in the memory 315 causes the processor 310 to perform the method or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory 315 can be, for example, one or more random access memory (RAM) devices, flash RAM, or electronically erasable programmable read only memory (EEPROM) devices. The memory 315 may also be used for storing temporary variables or other intermediate information during execution of instructions by processor 310.

The term "computer readable medium" as used herein refers to any medium that participates in providing instructions to the processor 310 for execution. Such a medium may take many forms, including but not limited to, non-volatile media, volatile media, and transmission media. Non-volatile media includes, for example, optical or magnetic disks. Volatile media includes dynamic memory, such as the memory 315. Transmission media includes coaxial cables, copper wire and fiber optics, including the wires or communication paths that comprise the connection network 305. Transmission media can also take the form of acoustic or light waves, such as those generated during radio wave and infrared data communications.

Common forms of computer readable media include, for example, a floppy disk, a flexible disk, hard disk, magnetic tape, or any other magnetic medium, a CD-ROM, any other optical medium, punch cards, paper tape, any other physical medium with patterns of holes, a RAM, a programmable ROM (PROM), an electrically PROM (EPROM), a flash EPROM, any other memory chip or cartridge, a carrier wave, or any other medium from which a data processing system can read.

Various forms of computer readable media may be involved in carrying one or more sequences of one or more instructions to the processor 310 for execution. For example, the instructions may initially be carried on a magnetic disk of a remote data processing system, such as a server (not illustrated). The remote data processing system can load the instructions into its dynamic memory and send the instructions over a communication link. The communications interface 340 can receive the data from the wireless adapter 350 and place the data on the connection network 305. The connection network 305 can then carry the data to the processor 310 for execution.

The communications interface 340 provides bidirectional data communication coupling for the first diagnostic instrument 110. In one embodiment, the communications interface 340 provides one or more external data ports for receiving electrical, radio frequency, or optical signals and converts signals received on the port(s) to a format suitable for transmission on the connection network 305.

In one embodiment, the communications interface 340 provides an external serial data port (such as RS-232 or universal serial bus (USB)). The wireless adapter 350 is coupled to the external serial data port to interface the first diagnostic instrument 110 with wireless communication signals. In this case, the wireless adapter 350 is a serial-to-wireless bridging device (such as one commercially available from Socket Communications, Inc., Newark, Calif.).

In one embodiment, the wireless adapter 350 includes multi-protocol communications logic or circuitry. That is, the wireless adapter can communicate selectively in various wireless protocols. For example, the wireless adapter 350 can communicate using Bluetooth as well as 802.11.

Accordingly, the first diagnostic instrument 110 can be coupled to both a Bluetooth network and an 802.11 network.

In addition, the wireless adapter 350 may include a pass-through port. A pass-through port is designed to emulate the functionality of the external data port to which the wireless adapter 350 is coupled. Specifically, in an embodiment where the communications interface 340 has a single port, the wireless adapter 350 provides an additional port for another device, such as a wireline connection. Although the wireless adapter 350 may require additional multiplexing circuitry, this can enable the first diagnostic instrument 110 to use wireless and wireline interfaces selectively or concurrently.

The data acquisition unit 340 is provides an interface for a test lead 347. The data acquisition unit 340 is controlled by the processor 310 to perform tests, measurements, or gathering of diagnostic information from the test lead 347 or other sensors. In one embodiment, the data acquisition unit 340 includes a plurality of analog-to-digital (A/D) converters or other logic for sampling input signals and providing those signals to the processor 310 for analysis.

The test lead 347 provides input signals to the first diagnostic instrument 110. For example, in an exhaust gas analyzer, the test lead 347 provides a sample of the exhaust gases to the first diagnostic instrument 110 for analysis. The test lead 347 can also provide electrical signals to the first diagnostic instrument 110. The test lead 347 may include a plurality of electrical or mechanical connections that can be coupled to various components of the device under test (e.g., an automobile). One skilled in the art will appreciate that the organization or structure of the test lead 347 need not be exclusively mechanical or electrical. That is, in an embodiment, the test lead 347 can include both electrical and mechanical portions. Returning the example above in an exhaust gas analyzer, the test lead 347 may include a mechanical portion for sampling exhaust gases as well as an electrical portion for connection to the automobile's oxygen sensor or onboard diagnostic interface. Although the test lead 347 is singularly illustrated in FIG. 3, a plurality of test leads may be used concurrently or separately with the first diagnostic instrument 110.

C. Computing Device

Figure 4:
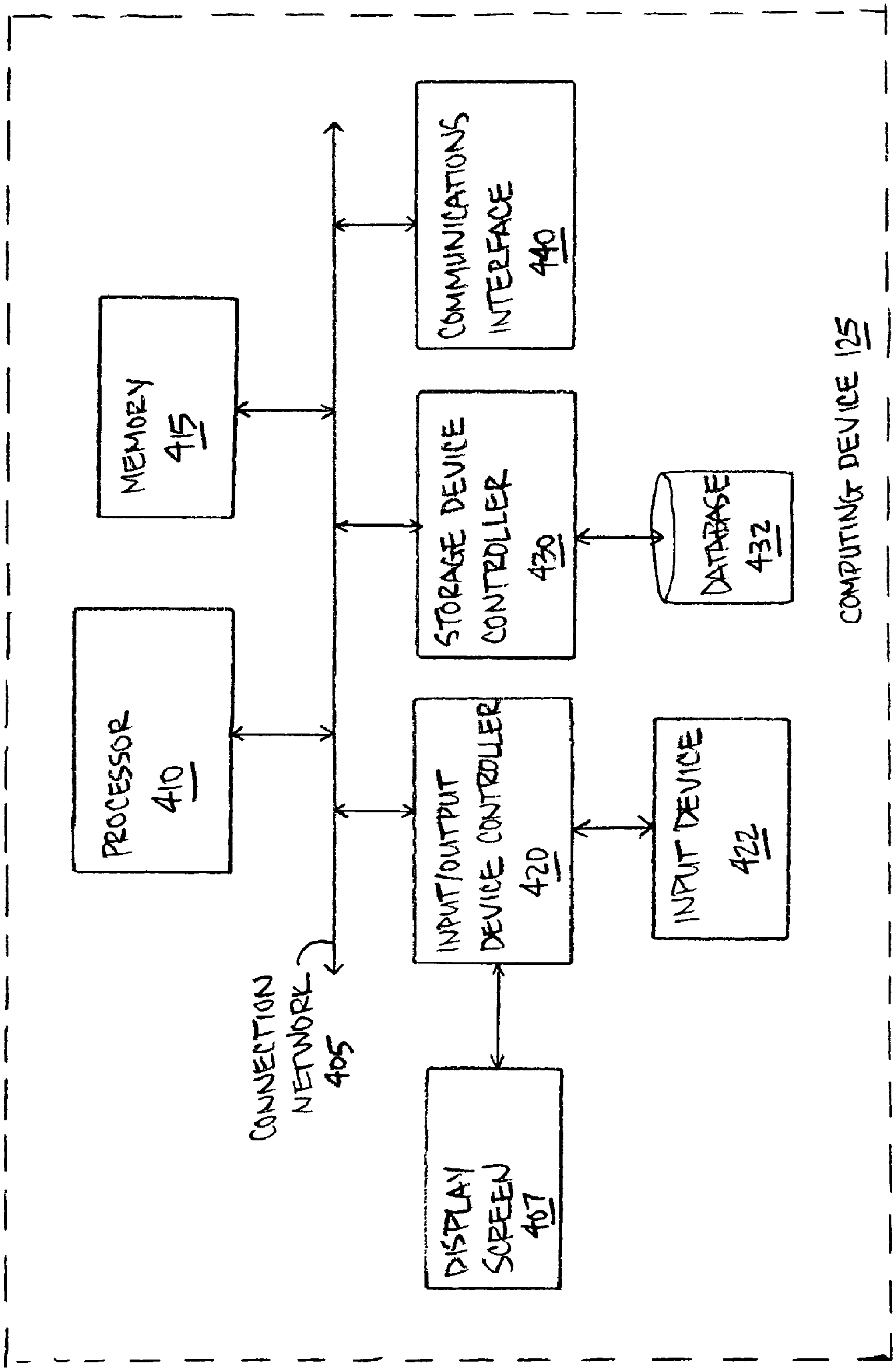
FIG. 4 is a block diagram of a computing device according to an embodiment of the present disclosure.

FIG. 4 is a block diagram of a computing device according to an embodiment of the present disclosure. In the illustrated embodiment, the computing device 125 includes a connection network 405, a processor 410, a memory 415, an input/output device controller 420, an input device 422, a display screen 407, a storage device controller 430, a database 432, and a communications interface 440.

Similar to the first diagnostic instrument described above, the connection network 405 operatively couples each of the processor 410, the memory 415, the input/output device controller 420, the storage device controller 430, and the communications interface 440. The connection network 405 can be an electrical bus, switch fabric, or other suitable interconnection system.

The processor 410 is a conventional microprocessor. In one embodiment, the computing device 125 is portable and powered by a battery. In this instance, the processor 410 or other circuitry may be designed for low power operation in order to provide satisfactory runtime before requiring recharging or replacement of the battery.

The processor 410 executes instructions or program code modules from the memory 415. The operation of the computing device 125 is programmable and configured by the program code modules. Such instructions may be read into memory 415 from another computer readable medium, such as a device coupled to the storage device controller 430. Execution of the sequences of instructions contained in the memory 415 causes the processor 410 to perform the method or functions described herein. In alternative embodiments, hardwired circuitry may be used in place of or in combination with software instructions to implement aspects of the disclosure. Thus, embodiments of the disclosure are not limited to any specific combination of hardware circuitry and software. The memory 415 can be, for example, one or more random access memory (RAM) devices, flash RAM, or electronically erasable programmable read only memory (EEPROM) devices. The memory 415 may also be used for storing temporary variables or other intermediate information during execution of instructions by processor 410.

The input/output device controller 420 provides an interface to the display screen 407 and the input device 422. The display screen 407 can include associated hardware, software, or other devices that are needed to generate a screen display. In one embodiment, the display screen 407 is a conventional liquid crystal display (LCD). One skilled in the art will appreciate that many suitable technologies can be used for the display screen 407, for example, a light emitting diode (LED), organic LED, cathode ray tube (CRT), or a plasma display panel (PDP). The display screen 407 may also include touch screen capabilities.

The illustrated embodiment also includes an input device 422 operatively coupled to the input/output device controller 420. The input device 422 can be, for example, an external or integrated keyboard or cursor control pad. In an automotive service environment, for example, it may be convenient for a technician to enter customer or vehicle information using the input device 422. Of course, customer or vehicle information can also be transmitted to the computing device 125 by another device such as a server (not illustrated). In one embodiment, the communications interface 440 can receive such information and can send the information to the processor 410 via the connection network 405.

The storage device controller 430 can be used to interface the processor 410 to various memory or storage devices. In the illustrated embodiment, a database 432 is shown for storing customer information, test results, control sequences, system configuration, and the like. As one skilled in the art will appreciate, the database 432 can be implemented on any suitable storage medium, such as magnetic, optical, or electrical storage. Additionally, the database 432 may store and retrieve information that is used by one or more of the functional modules described below and with reference to FIG. 5.

The communications interface 440 provides bidirectional data communication coupling for the computing device 125. In one embodiment, the communications interface 440 provides one or more input/output ports for receiving electrical, radio frequency, or optical signals and converts signals received on the port(s) to a format suitable for transmission on the connection network 405. The communications interface 440 can include a radio frequency modem and other logic associated with sending and receiving wireless communications. For example, the communications interface 440 can provide Bluetooth and/or 802.11 wireless capability for the computing device 125.

1. Program Code Modules

Figure 5:
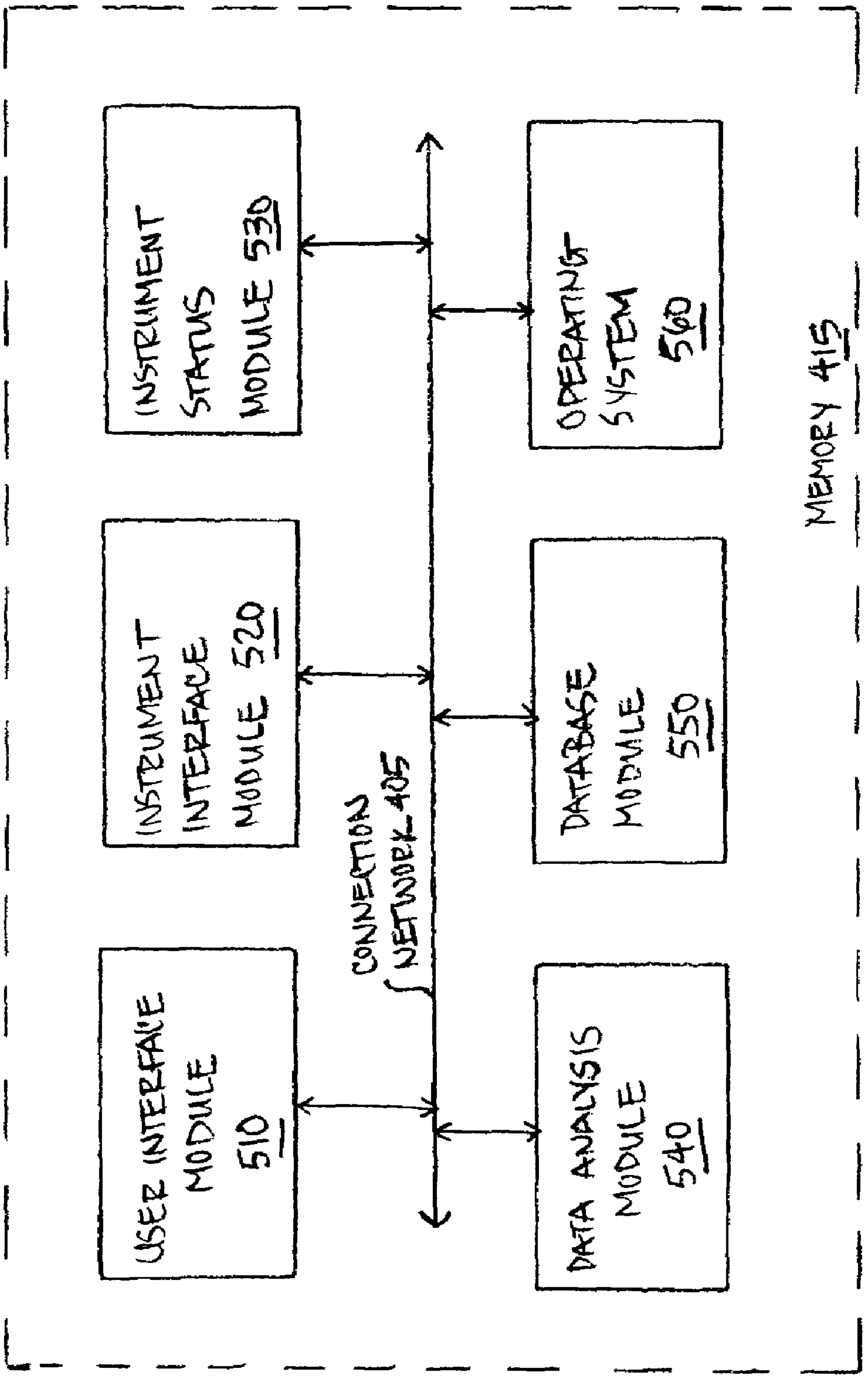
FIG. 5 illustrates program code modules for an embodiment of the present disclosure.

FIG. 5 illustrates program code modules for an embodiment of the present disclosure. The illustrated embodiment includes a user interface module 510, an instrument interface module 520, an instrument status module 530, a data analysis module 540, a database module 550, and an operating system module 560. The connection network 405 communicatively couples each of the modules 510, 520, 530, 540, 550, 560.

The modules 510, 520, 530, 540, 550, 560 include program instructions that can be executed on, for example, the processor 410 to implement the features or functions of the present disclosure. The modules 510, 520, 530, 540, 550, 560 are typically stored in a memory, such as the memory 415. As described above, the program instructions can be distributed on a computer readable medium or storage volume. The computer readable storage volume can be available via a public network, a private network, or the Internet. Program instructions can be in any appropriate form, such as source code, object code, or scripting code. One skilled in the art will recognize that arrangement of the modules 510, 520, 530, 540, 550, 560 represents one example of how the features or functionality of the present disclosure can be implemented.

The user interface module 510 includes display elements that can be presented on the display screen 407. The user interface module 510 assembles the display elements into menus or selectable display screens. An active selection element, for example, can be used to indicate which of the available diagnostic instruments are providing diagnostic information to the computing device 125. An available diagnostic instrument is one that is online and associated with or coupled to a network, such as the network 215.

The instrument interface module 520 includes commands, protocol descriptions, data types, or other information used to send information to or receive information from the diagnostic instrument 110. Of course, the instrument interface module 520 can include information about multiple diagnostic instruments. The instrument interface module 520 can operate in conjunction with the user interface module 510 to invoke functions of the diagnostic instrument 110.

The instrument status module 530 includes information about the operation status of the diagnostic instruments 110, 115, 120. In one embodiment, the diagnostic instruments 110, 115, 120 communicate their status to the computing device 125. For example, in a gas analyzer, the status information may include that the pump is on, the exhaust probe is in the tailpipe, and the vehicle is running hot. The instrument status module 530 receives and stores this information for subsequent processing.

Further, in an embodiment, the instrument status module 530 manages whether the diagnostic instruments 110, 115, 120 are available for use by the computing device 125. The instrument status module 530 can query the diagnostic instruments 110, 115, 120 for online status. The instrument status module 530 can also asynchronously receive online status messages from the diagnostic instruments 110, 115, 120. For example, the first diagnostic instrument 110 may broadcast an "I am alive" message to the listening computing devices 125, 130, 135.

The data analysis module 540 receives requested data or data streams from diagnostic instruments 110, 115, 120. The data analysis module 540 can parse a data stream and assign an identifier to each data segment. The identifier enables the data analysis module 540 or processor 410 to determine which of the diagnostic instruments 110, 115, 120 supplied the data segment. Data segments may be processed differently for display or storage for each of the diagnostic instruments 110, 115, 120. The identifier can be generated by the data analysis module 540 or received from the diagnostic instruments 110, 115, 120.

One advantage of the identifier is to enable a diagnostic instrument to transmit multiple data streams. Because each of the data streams have the same media access control (MAC) identifier, the data analysis module 540 assigns an identifier to distinguish further the data streams and the data segments associated therewith.

The database module 550 includes functionality for storing and for retrieving customer information, test results, data received from diagnostic instruments 110, 115, 120, and the like. When performing a test, for example, the first diagnostic instrument 110 may provide a raw data stream of the measurements which the database module 550 records. Accordingly, the database module 550 can provide measurement data to the data analysis module 540 for analysis.

The operating system module 360 represents a conventional operating system for a handheld or embedded device, such as Microsoft Windows CE or Windows Mobile (which are commercially available from Microsoft Corp., Redmond, Wash.). The operating system module 360 provides an application programming interface (API) through which the modules 310, 320, 330, 340, 350 or other application programs interact with the computing device 105. For example, the user interface module 310 calls a function of the operating system module 360 in order to display an element on the display screen 107.

D. Methods

Figure 6:
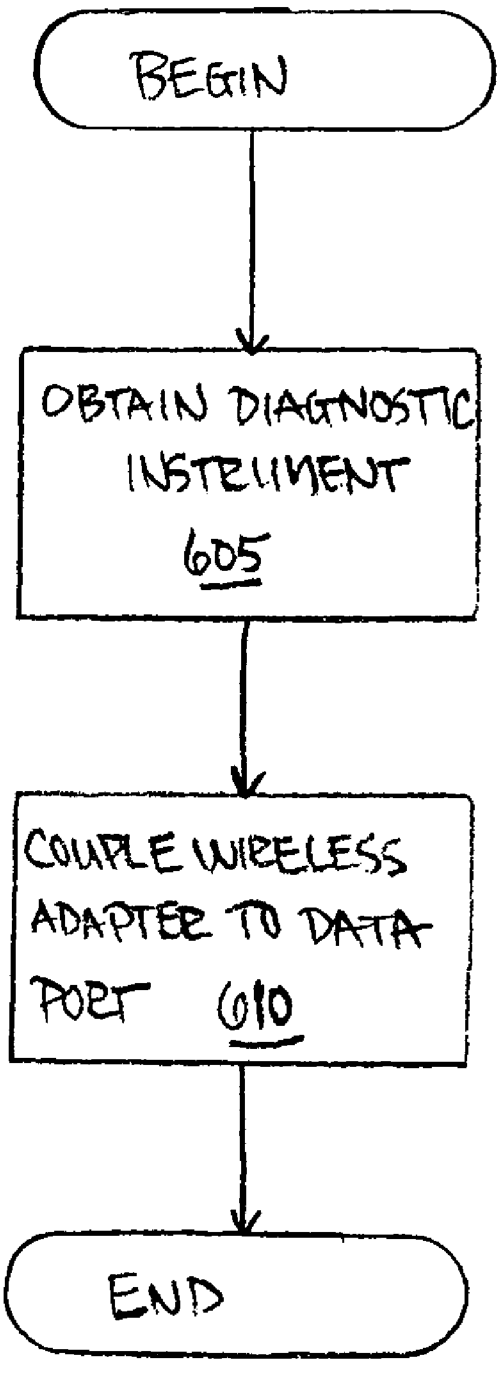
FIG. 6 is a flowchart illustrating a method for enabling wireless communication of vehicle diagnostic information according to an embodiment of the present disclosure.

FIG. 6 is a flowchart illustrating a method for enabling wireless communication of vehicle diagnostic information according to an embodiment of the present disclosure. The illustrated method begins with obtaining 605 a diagnostic instrument 110. The diagnostic instrument 110 includes an external data port. A wireless adapter 350 is coupled 610 to the external data port. This enables the diagnostic instrument 110 to communicate wirelessly with the network 215 or the computing device 125, for example.

Figure 7:
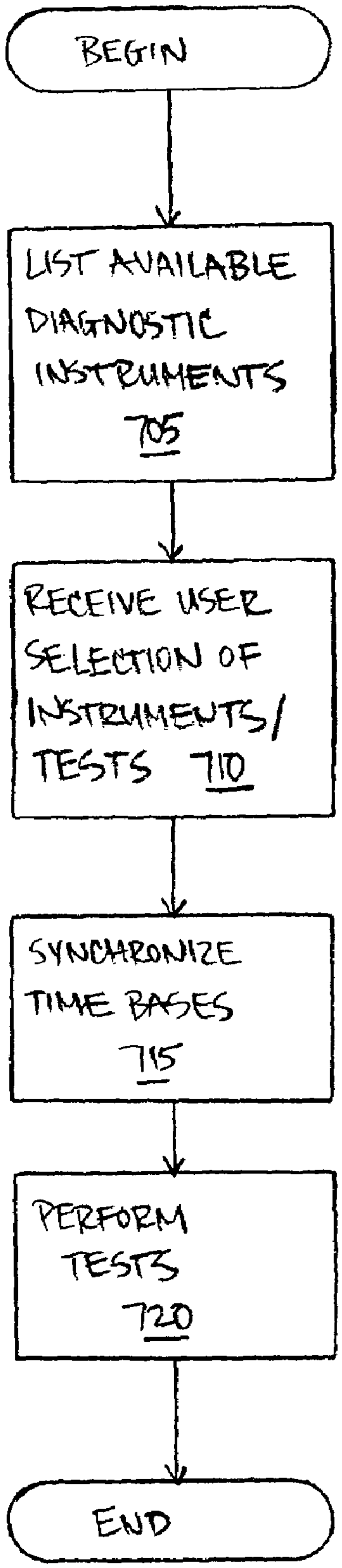
FIG. 7 is flowchart illustrating a method for controlling multiple diagnostic instruments using a computing device according to an embodiment of the present disclosure.

FIG. 7 is flowchart illustrating a method for controlling multiple diagnostic instruments using a computing device according to an embodiment of the present disclosure. The illustrated method begins with listing 705 the available diagnostic instruments 110, 115, 120 on a display screen 407. The user provides a selection of the diagnostic instruments 110, 115, 120 that are to be used for a test. The selection is received 710 by the computing device 125. The computing device 125 then synchronizes 715 the time bases of the selected or participant diagnostic instruments 110, 115, 120.

In one embodiment, the computing device 125 uses short start and stop commands to synchronize the selected diagnostic instruments 110, 115, 120. The short commands can be transmitted to the diagnostic instruments 110, 115, 120 quickly. When the diagnostic instruments 110, 115, 120 receive a short start command, they begin taking measurements or capturing data. The computing device 125 can offset the transmission of start/stop commands depending on the amount of time it takes a particular diagnostic instrument to respond to the command. For example, a gas analyzer may being taking measurements 0.5 seconds after receiving the start command.

In another embodiment, the computing device 125 can use a counter or time base synchronization protocol. For example, the computing device 125 can query the current time from each of the diagnostic instruments 110, 115, 120 and calculate a time base correction for each. When processing the diagnostic information, the computing device 125 can account for the time base correction.

One skilled in the art will appreciate that synchronization 715 may not be necessary before each test. That is, synchronization 715 can be programmed to occur once for each measurement session. In step 720, the diagnostic instruments 110, 115, 120 perform the requested tests.

Figure 8:
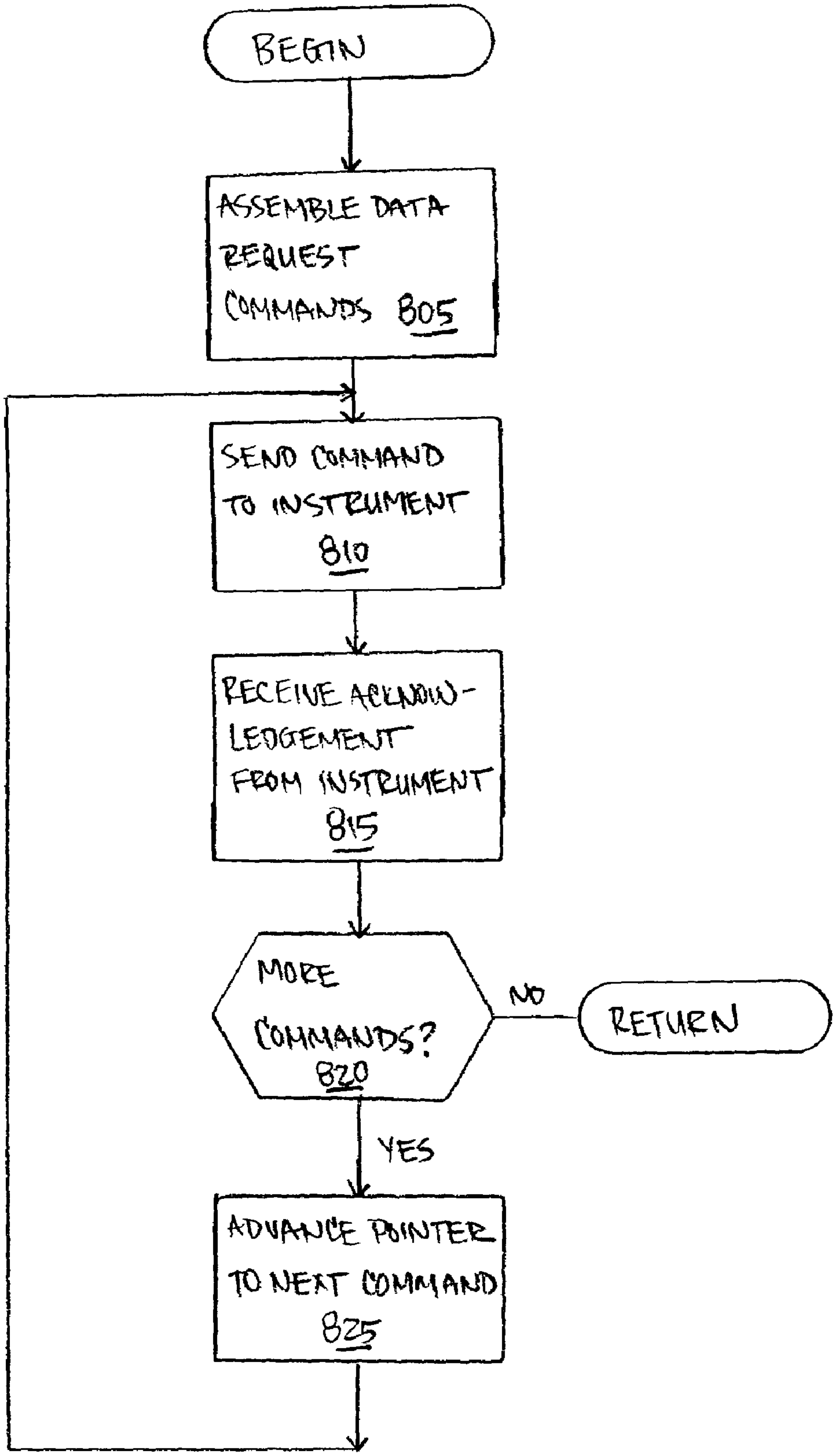
FIG. 8 is a flowchart illustrating a method for sending commands to a diagnostic instrument according to an embodiment of the present disclosure.

FIG. 8 is a flowchart illustrating a method for sending commands to a diagnostic instrument according to an embodiment of the present disclosure. Unlike conventional wireline communication protocols, where the computing device 125 waits for a specified period of time before sending commands, in a wireless architecture the computing device 125 can send commands responsive to an acknowledgment signal generated by the wireless adapter 350.

The illustrated method begins with assembling 805 data request commands for transmission to the diagnostic instruments 110, 115, 120. These commands can be stored in an appropriate data structure, such as an array. The first command is sent 810 to the corresponding diagnostic instrument. An acknowledgement of the command is received 815 from the wireless adapter 350 coupled to the diagnostic instrument. Specifically, the wireless adapter 350 media access control layer acknowledges that it received the data that represents the command. Next, it is determined 815 whether there are more commands to be sent. If not, the method returns to the calling process. If there are more commands, the array pointer is advanced 825 to the next element and the method repeats with the sending 810 of the command.

Figure 9:
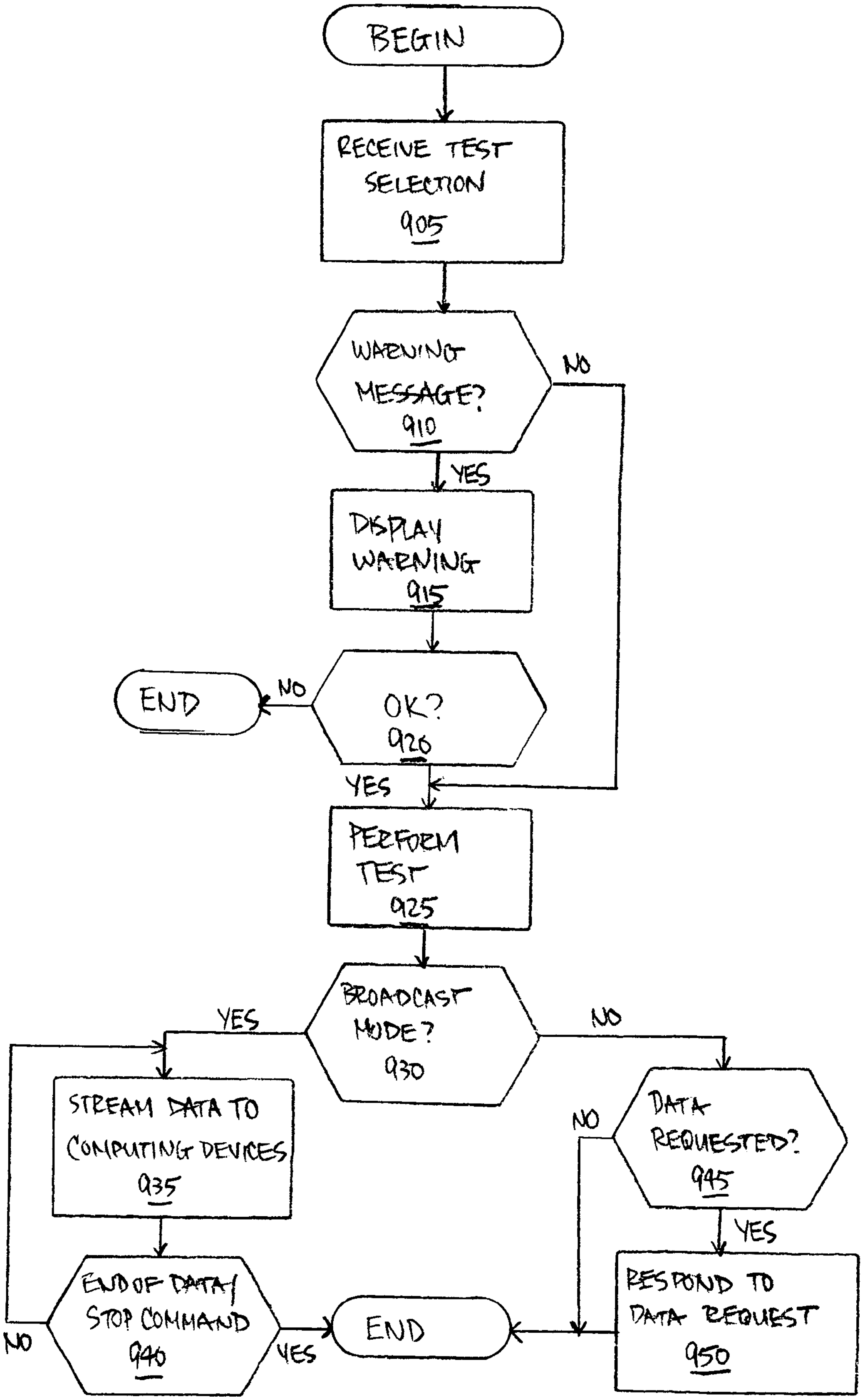
FIG. 9 is a flowchart illustrating a method for executing a diagnostic test according to an embodiment of the present disclosure.

FIG. 9 is a flowchart illustrating a method for executing a diagnostic test according to an embodiment of the present disclosure. The illustrated method begins with the computing device 125 receiving 905 the test selection. Because the computing device 125 is wirelessly coupled to the diagnostic instruments 110, 115, 120, the operator may have a partially or completely obstructed view of the test site. The computing device 125 determines 910 whether a warning message is appropriate for the test selection. For example, if the operator invokes a dynamometer test, the computing device 125 can be programmed to display a warning to the technician to check the test site. This ensures the safety of those around the test site.

If a warning message is not needed, the test is performed 925. If a warning message is needed, however, it is displayed 915. The technician then indicates whether it is safe to continue 920. If not, the method is ended. Otherwise, the test is performed 925.

For diagnostic instruments 110, 115, 120 that are in broadcast mode 930, then data is streamed to the listening computing devices 125, 130, 135. When a stop command or the end of the test is reached 940, the method ends. For diagnostic instruments 110, 115, 120 that are not in broadcast mode 930, the method determines if the diagnostic data has been requested 945. If so, a response 950 to the data request is generated. If no additional data requests are received, the method ends.

E. Computing Device User Interface

Figure 10:
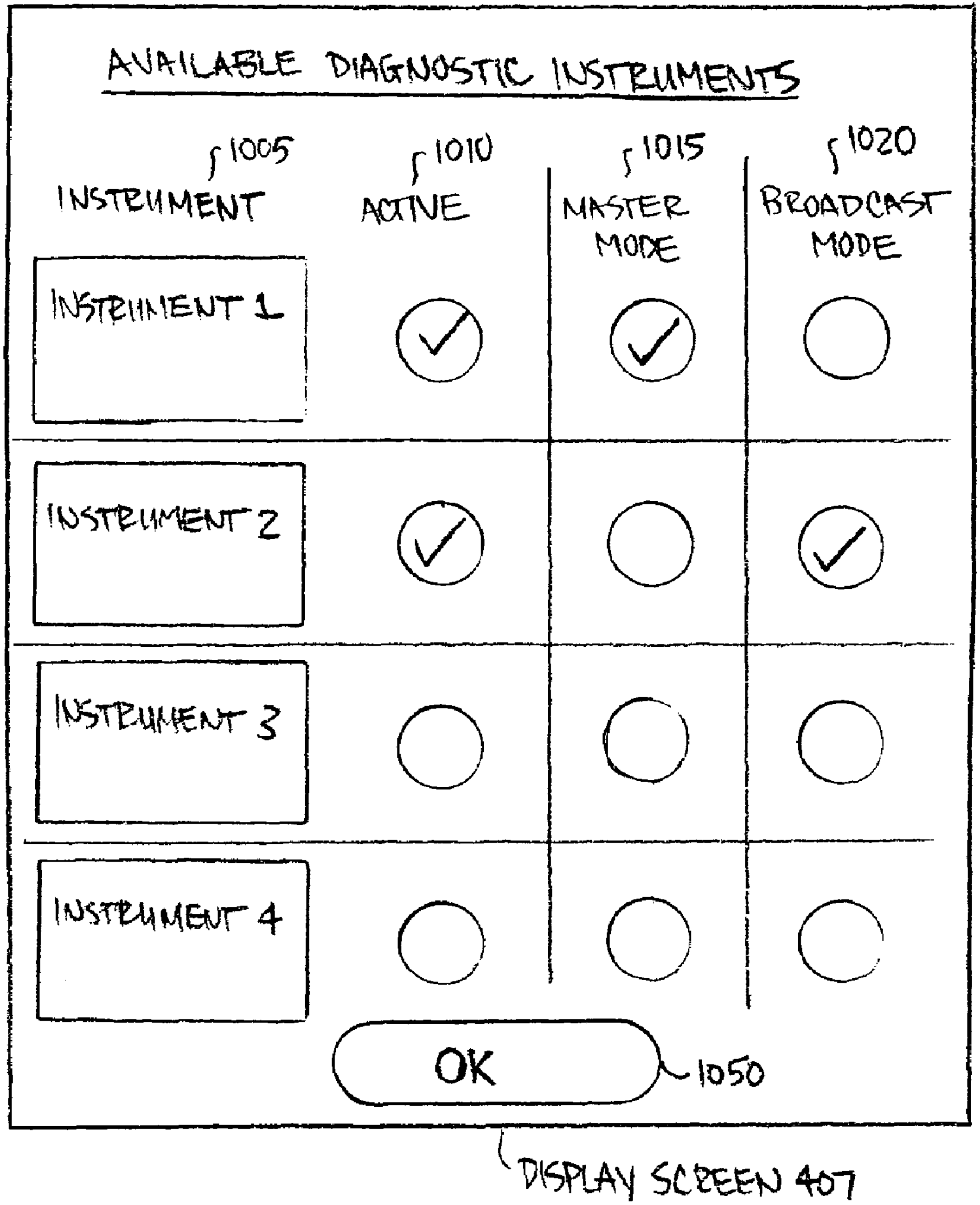
FIG. 10 is a diagram illustrating a user interface for diagnostic instrument selection according to an embodiment of the present disclosure.

FIG. 10 is a diagram illustrating a user interface for diagnostic instrument selection according to an embodiment of the present disclosure. The illustrated user interface includes an instrument selection element 1005, an active selection element 1010, a master mode selection element 1015, a broadcast mode selection element 1020, and an “ok” button 1050 shown on the display screen 407.

In one embodiment, the instrument selection element 1005 represents a list of the available diagnostic instruments 110, 115, 120. A diagnostic instrument 110, 115, 120 is available when it is online and the computing device 125 can communicate with it. Of course, the contents of the instrument selection element 1005 can be dynamic and responsive to changes in instrument status.

The active selection element 1010 represents whether the user is interested in receiving data or measurements from corresponding instrument. The master mode selection element 1015 indicates whether the computing device 125 is able to issue control commands to the corresponding instrument. Generally each of the diagnostic instruments 110, 115, 120 only permit a single computing device to issue control commands at a time. That is, although many computing devices can listen to the response or data stream, only one computing device can control a diagnostic instrument 110, 115, 120 at a time. For instruments that are in non-master mode (such as instruments 2, 3 and 4 in the illustrated example), the technician can request master mode from the computing device that is currently the master.

The broadcast mode selection element 1020 indicates whether the corresponding instrument is broadcasting its diagnostic information to listening computing devices 125, 130, 135. If the technician desires to receive a broadcast, he or she can use the active selection element 1010 to listen to the data stream. Invoking the “ok” button 1050 returns the display screen 407 to other functions.

Figure 11:
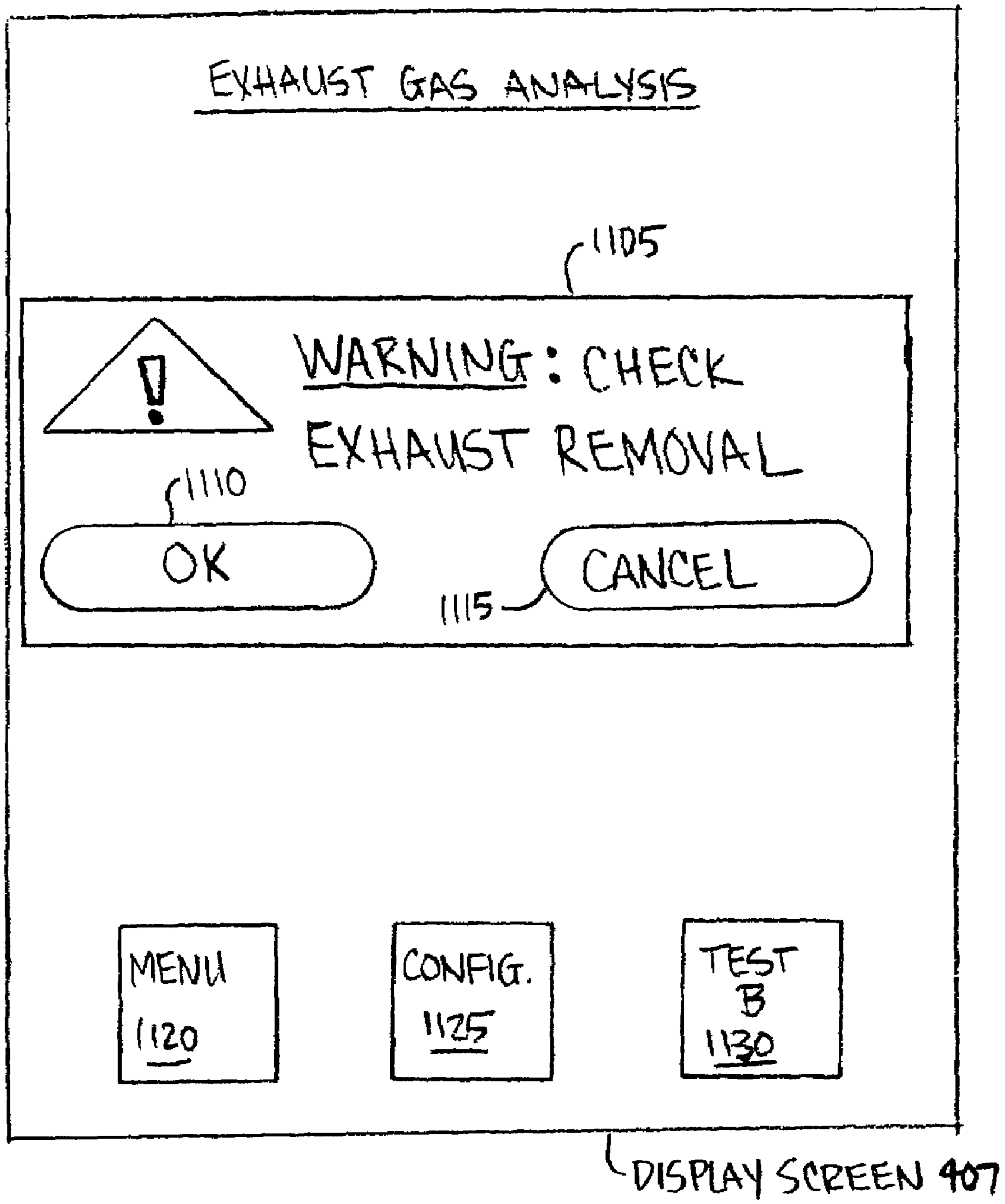
FIG. 11 is a diagram illustrating a user interface for a warning message according to an embodiment of the present disclosure.

FIG. 11 is a diagram illustrating a user interface for a warning message according to an embodiment of the present disclosure. The illustrated display screen 407 includes a warning message 1105, a menu selection element 1120, a configuration selection element 1125, and a “test B” selection element 1130. The warning message 1105 includes an “ok” button 1110, a “cancel” button 1115.

The warning message 1105 is an example of the type of warning that can be displayed before a particular test is executed. In this example, a technician has requested an exhaust gas analysis. Because of the dangers of releasing exhaust gases into a service facility where human beings are working, the warning message 1105 prompts the technician to check the placement of the exhaust gas removal hose of the removal system. The warning message 1105 reminds the technician that dangerous gases may be released and that he should make sure to invoke the removal system.

The technician can clear the warning message 1105 by selecting the “ok” button 1110. The technician can also cancel the test by selecting the “cancel” button 1115. Of course, the placement of the “ok” button 1110 on the display screen 407 can be randomized to encourage the technician to read and to respond to the warning message 1105 appropriately.

The display screen 407 also provides other selection options. The technician can return to the menu by invoking the menu selection element 1120. The technician can adjust configuration parameters by invoking the configuration selection element 1125. Further, the technician can skip to another related test by invoking the “test b” selection element 1130.

Having described embodiments of wireless communication for diagnostic instrument (which are intended to be illustrative and not limiting), it is noted that modifications and variations can be made by persons skilled in the art in light of the above teachings. It is therefore to be understood that changes may be made in the particular embodiments disclosed that are within the scope and spirit of the disclosure as defined by the appended claims and equivalents.

What is claimed is:

1. A user interface for a computing device to control a plurality of diagnostic instruments, the user interface comprising:

an instrument selection element configured to list available ones of the plurality of diagnostic instruments; and an active selection element corresponding to the instrument selection element and configured to select for use, by the computing device, the data from the corresponding diagnostic instrument.

2. The user interface of claim 1, further comprising:

a broadcast mode selection element corresponding to the instrument selection element and configured to invoke broadcast mode on the corresponding diagnostic instrument.

3. The user interface of claim 1, further comprising:

a master mode selection element corresponding to the instrument selection element and configured to invoke master mode on the corresponding diagnostic instrument.

* * * * *